United States Patent
Hartupee, Jr. et al.

(10) Patent No.: US 8,953,218 B2
(45) Date of Patent: *Feb. 10, 2015

(54) IMAGING DATA STREAM METHOD AND APPARATUS FOR FULL-COLOR SUPPORT

(75) Inventors: George Kenneth Hartupee, Jr., Rancho Cucamonga, CA (US); Hayley H. Yau, Los Angels, CA (US)

(73) Assignee: Xerox Corporation, Norwalk, CT (US)

( * ) Notice: Subject to any disclaimer, the term of this patent is extended or adjusted under 35 U.S.C. 154(b) by 1851 days.

This patent is subject to a terminal disclaimer.

(21) Appl. No.: 11/598,972

(22) Filed: Nov. 14, 2006

(65) Prior Publication Data
US 2008/0112000 A1    May 15, 2008

(51) Int. Cl.
*G06F 15/00* (2006.01)
*G06K 15/02* (2006.01)
(Continued)

(52) U.S. Cl.
CPC ............ *G06K 15/02* (2013.01); *G06K 15/1811* (2013.01); *G06K 15/1807* (2013.01); *G06F 3/1298* (2013.01)
USPC ............. 358/1.9; 358/1.1; 358/1.15; 358/2.1; 358/518; 358/523; 382/162; 382/167; 707/756; 707/771; 707/773; 710/8; 710/10; 710/14; 710/15; 710/16; 715/200; 715/229; 715/273; 715/275; 715/276; 717/100; 717/114; 717/115; 717/138; 717/139; 719/321; 719/322; 719/323; 719/327; 101/171; 101/211; 101/483

(58) Field of Classification Search
USPC .......... 358/1.1, 1.4, 1.6, 1.9, 1.11, 1.13, 1.14, 358/1.15, 1.16, 1.18, 2.1, 518, 523, 524; 710/8, 10, 14, 15, 16, 19; 715/200, 715/229, 321, 323, 327; 382/162, 167
See application file for complete search history.

(56) References Cited

U.S. PATENT DOCUMENTS

| 4,763,241 | A | * | 8/1988 | Egawa et al. | ............... 347/132 |
| 5,134,493 | A | * | 7/1992 | Laman et al. | ............... 358/296 |

(Continued)

FOREIGN PATENT DOCUMENTS

| JP | 2000267824 A | * | 9/2000 | ............... G06F 3/12 |
| JP | 2000267824 A | * | 9/2000 | ............... G06F 3/12 |

OTHER PUBLICATIONS

XEROX Special Information Systems, LCDSSpectrum Implementation Guide, Mar. 2006, entire document.*

(Continued)

*Primary Examiner* — Quang N Vo
(74) *Attorney, Agent, or Firm* — Kevin Soules; Kermit D. Lopez; Luis M. Ortiz (57) ABSTRACT

A method and apparatus for extending LCDS imaging data stream imaging capabilities. An imaging data stream can be modified to permit the imaging data stream to implement at least one full-color call for rendering full-color forms and full-color jobs via at least one rendering device within a rendering system. This can be accomplished by creating and associating at least one full-color extension with a syntax of the imaging data stream in order to implement the at least one full-color call in an extensible set of color spaces, and also compactly decoding, storing indexing and searching the at least one full-color call within a particular job. In addition, an LCDS imaging data stream can be modified to provide an image substitution pathway to permit at least one full-color image included in said LCDS imaging data stream to be substituted for monochrome images or highlight color images.

20 Claims, 3 Drawing Sheets (51) Int. Cl.
*G06K 1/00* (2006.01)
*G06F 3/12* (2006.01)

(56) References Cited

U.S. PATENT DOCUMENTS

| | | | | |
|---|---|---|---|---|
| 5,153,739 | A * | 10/1992 | Laman et al. | 358/300 |
| 5,237,425 | A * | 8/1993 | Tagami et al. | 358/300 |
| 6,894,797 | B1 * | 5/2005 | Hayes et al. | 358/1.15 |
| 6,980,996 | B1 * | 12/2005 | Mustoe et al. | 1/1 |
| 2004/0190042 | A1 * | 9/2004 | Ferlitsch et al. | 358/1.15 |
| 2005/0050465 | A1 * | 3/2005 | Horton et al. | 715/526 |
| 2005/0225782 | A1 * | 10/2005 | Livengood et al. | 358/1.9 |
| 2006/0119869 | A1 | 6/2006 | Laman et al. | 358/1.9 |

OTHER PUBLICATIONS

XEROX Special Information Systems, LCDS—Spectrum Implementation Guide, Mar. 2006, entire document.*
Lytrod Software, Proform97(tm) description, 1 page.*
Lytrod Software, Proform97(tm) sales brochure, Jun. 28, 2004, 2 pages.*
XEROX eStore, Lytrod Software Proform97(tm) overview, 2 pages.*
XPLOR, Chapter Meeting Summary, Jan. 19, 2006, 5 pages.*
Elixir Technologies, DesignPro Tools(tm) Xerox product description, 3 pages.*
Xerox.com, TCX Pricing for NY State and local Government, Sep. 23, 2004, 4 pages.*
Lytrod Software, Proform97(tm) advertisement / specifications sheet, Jun. 28, 2004, 2 pages.*
Lytrod Software, Proform97(tm) advertisement / specifications sheet, obtained from: http://web.archive.org/web/20040628131330/lytrod.com/products/Product_PDFs/Proform97_Flyer_Color.pdf, available date Jun. 28, 2004, 2 pages.*
Lytrod Software, Proform97(tm) description, 1 page, obtained from http://www.lytrod.com/products/proform97.php.*
Lytrod Software, Proform97(tm) advertisement / specification sheet, obtained from: http://web.archive.org/web/20040628131330/lytrod.com/products/Product_PDFs/Proform97_Flyer_Color.pdf, available date Jun. 28, 2004, 2 pages.*
XEROX Corporation, Xerox 4890 Highlight Color Laser Printing System Product Reference, version 5.0, Nov. 1994, all pages.*
XEROX Corporation, Xerox 4850/4890 Highlight Color Laser Printing Systems Print Description Language Reference, Version 5.0, Nov. 1994, all pages.*
XEROX Corporation, Xerox 4850/4890 Highlight Color Laser Printing System Forms Creation Reference, version 5.0, Nov. 1994, all pages.*
XEROX Corporation, Xerox DocuPrint EPS—Using LCDS Print Description Language, version 3.7, May 2003, all pages.*
Lytrod Software, Proform97 (TM) product order form, Aug. 23, 2004, p. 1.*
Lytrod Software, Proform97 (TM) product description web page, Oct. 13, 2004, p. 1.*
XEROX, Host Forms Description Language 3.2 for IBM MVS Creating Forms, Aug. 1995, all pages.*
www.Rane.com, definition of "extensible", Aug. 11, 2006, Wayback Machine, from URL: http://web.archive.org/web/20060811053102/http://www.rane.com/par-e.html.*
Lytrod Software, Proform97 (TM) description, 1 page, obtained from http://www.lytrod.com/products/proform97.php.*
*Xerox DocuSP Color Controller,* Xerox Corporation.
*Xerox DocuSP,* Xerox Corporation.
*Highlight Color's Communications Effectiveness, Production Efficiency Arrives for New Class of More Graphically Oriented Documents,*Production Systems Group, Public Relations Offices, Xerox Corporation.
*LCDS—Spectrum Implementation Guide,* Mar. 2006, Xerox Corporation.
*Xerox DocuTech 128/155/180 Highlight Color Systems,* Xerox Corporation.

* cited by examiner

IMAGING DATA STREAM METHOD AND APPARATUS FOR FULL-COLOR SUPPORT

TECHNICAL FIELD

Embodiments are generally related to data-processing methods and systems. Embodiments are also related to the field of printing methods and systems. Embodiments are additionally related to imaging data streams and color imaging models thereof. Embodiments are also related to data streams for imaging via document rendering systems.

BACKGROUND

Digital printing systems can be constructed from two essential components. The first component is a print engine and the second component is a print controller. The print engine and controller units can be developed and implemented independently of one another, or integrated into the product that is ultimately manufactured. In general, the print controller handles communications and interfaces with a host system.

A print controller can also interpret print commands transmitted from the host and translate them into signals required to drive the print engine. Printing functions ranging from color management to duplexing generally depend on the interaction of the print engine and the controller. Digital print systems include, for example, desktop units, copy machines, printers, print-on-demand systems, and so forth.

One of the functions of a print controller is the ability to effectively enable a print stream format. A number of different print stream formats are utilized in the printing arts. A commonly utilized print stream format (also referred to herein as an "imaging data stream") is the Line Conditioned Data Stream (LCDS), developed by Xerox Corporation of Stamford, Conn. LCDS is one type of an imaging data stream that can be utilized to drive, for example production printers. Unlike page description languages, which create pages from high-level graphical constructs, print command languages such as LCDS contain printer commands interspersed with data and are processed and executed sequentially.

One particular type of LCDS format is known as "Highlight Color LCDS". The concept of "Highlight Color" has been implemented in the context of so-called "Highlight" printers. Anyone who has watched U.S. television in recent years has probably seen one of the recent commercials that begin in black-and-white, then introduces a single color to spotlight the sponsor's product or logo. The effect is dramatic, immediately focusing the viewer's attention right where the advertiser wants it.

In full-color commercials, colors are selected and coordinated to establish the spot's mood, its "look and feel." But when black-and-white images are used to establish the atmosphere, color plays a much different role. While the color selected usually ties to the sponsor's brand identity, the color choice almost doesn't matter. Whatever the color, it will contrast dramatically with the black-and-white background and have the desired effect of getting the viewer's attention.

This distinction between the functions of highlight and full color has long been recognized in document production, and actually demonstrates a fundamental difference between transactional and publishing print applications. In transactional printing of invoices, statements and other documents that often are jammed with data, highlight color can help the reader make sense of the document by directing attention to the most critical information—the amount and date due, for example. In publishing, color more often is deployed artistically, to establish the look and feel of a brochure or advertisement.

Today, however, transactional and publishing applications increasingly borrow from one another, blurring distinctions between them. More publishing documents use variable data and images to personalize individual pieces in long print runs, which is a capability that had long been the sole realm of transactional printing. Similarly, transactional applications have grown more graphically sophisticated, moving from graphically limited line printers to laser models offering increasingly finer print resolutions and imaging capabilities.

Further, as corporate reprographics centers merge with data center printing operations, and as centralized applications move to distributed locations, printing equipment often is expected to serve a wider range of applications. Xerox Corporation of Stamford, Conn. has developed a line of highlight color production printers that can print at, for example, resolutions of 600 dots per inch (dpi) responds to these trends. With such newly developed highlight color production rendering devices, two-color digital printing can now support the increasing requirement for sophisticated graphical capabilities and data stream flexibility in transactional printers.

Currently, users who desire to print Highlight Color LCDS jobs with a variety of base toners must either maintain multiple highlight printers with different loaded toner or stop the production between runs to change the base Highlight toner. There presently does not exist a technique or device for readily and efficiently adding full color elements to existing or new jobs. This ability is increasingly important as full-color rendering devices such as printers are achieving greater production speeds. It is believed that a need exists for a method and system that would permit LCDS users to explore full color rendering capabilities without expensive data and resource translations. The alternative is for users to convert perhaps millions of records of LCDS data to another format, which is often problematic and expensive.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved rendering method and apparatus for an LCDS imaging data stream.

It is another aspect of the present invention to provide for a method and apparatus for extending LCDS imaging data stream imaging capabilities.

It is a further aspect of the present invention to provide for a method and apparatus for extending Highlight Color LCDS to print full-color forms and jobs.

The aforementioned aspects and other objectives and advantages can now be achieved as described herein. A method and apparatus for extending LCDS imaging data stream imaging capabilities is disclosed. An LCDS imaging data stream can be modified to permit the imaging data stream to implement at least one full-color call for rendering full-color forms and full-color jobs via at least one rendering device within a rendering system. This can be accomplished by creating and associating at least one full-color extension with the syntax of the imaging data stream in order to implement at least one full-color call in an extensible set of color spaces, and also to compactly decode, store, index, and search at least one full-color call within a particular job.

Additionally, a pathway can be provided to query the rendering system to identify a current default base color of a rendering queue used in the rendering system, as required by the rendering system. Additionally, one or more full-color text calls associated with the LCDS imaging data stream can be reduced using a multiply-recursive look-up and parse algorithm in order to recognize at least one color space of the imaging data stream.

An intermediate form associated with the LCDS imaging data stream can be modified to attach at least one full-color index to data and for a later retrieval of at least one full-color index. Also an image substitution pathway can be provided to permit one or more full-color images and/or data included in the imaging data stream to be substituted for monochrome or highlight color images. Each data item or image included in the LCDS imaging data stream can also be automatically passed to a rendering interface for full-color rendering.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The embodiments discussed herein can be implemented in the context of imaging data streams. An example of an imaging data stream is the Line Conditioned Data Stream (LCDS), which is a line data stream utilized to drive Xerox Corporation's production printers from host systems. Unlike page description languages, which create pages from high-level graphical constructs, print command languages such as LCDS contain printer commands interspersed with data and are processed and executed sequentially.

Figure 1:
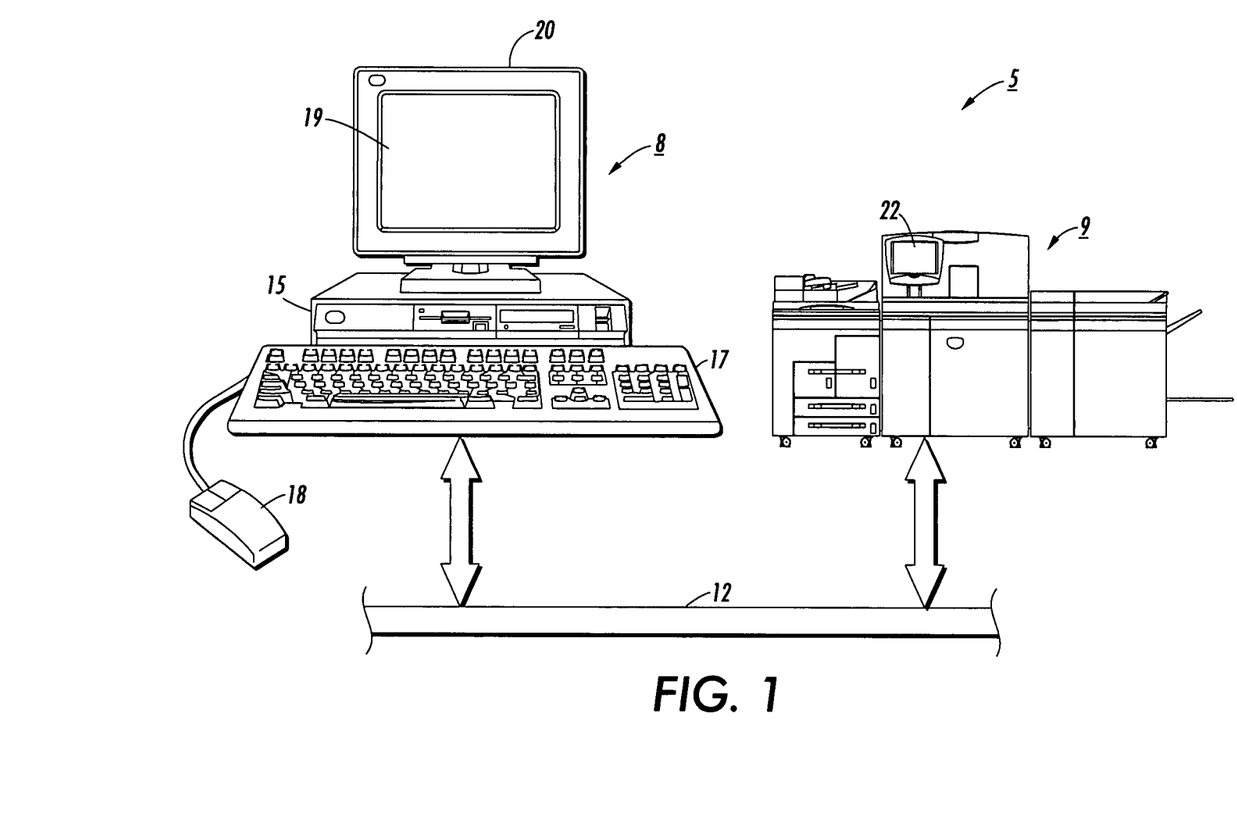
FIG. 1 illustrates a diagram of a data-processing system including a rendering device adapted to render electronically encoded documents transmitted from a data-processing apparatus, in accordance with a preferred embodiment.

With reference now to the drawings where the showings are for the purpose of illustrating a preferred embodiment of the invention and not for limiting the same, FIG. 1 illustrates an electronic document processing or rendering system 5 that can be implemented in accordance with one embodiment. Alternative or preferred embodiments disclosed herein can therefore be implemented in the context of the rendering system 5 depicted in FIG. 1. In general, the electronic document processing (rendering) system 5 includes a data-processing apparatus 8 and a rendering device 9 that are connected with a suitable communication channel such as, for example an Ethernet connection 12. The connection 12 enables image data from one or more remote sources such as data-processing apparatus 8, to be input to the rendering device 9 for hardcopy rendering. The data-processing apparatus 8 can generally be provided in the form of one or more processor readable storage devices having a processor readable code embodied on the processor readable storage devices, the processor readable code for programming one or more processors to perform one or more different methods.

The data-processing apparatus 8 includes a processing unit 15 for processing user inputs received from keyboard 17 and pointing device or mouse 18, through user interface 19 displayed on monitor 20. The user interface 19 collectively represents user inputs through which control instructions are used to develop electronic images. The rendering device 9, which can be configured to include its own user interface 22 for monitoring print job requests, can be adapted to print hardcopy color and/or black and white image renderings of selected electronic images developed via data-processing apparatus 8.

Figure 2:
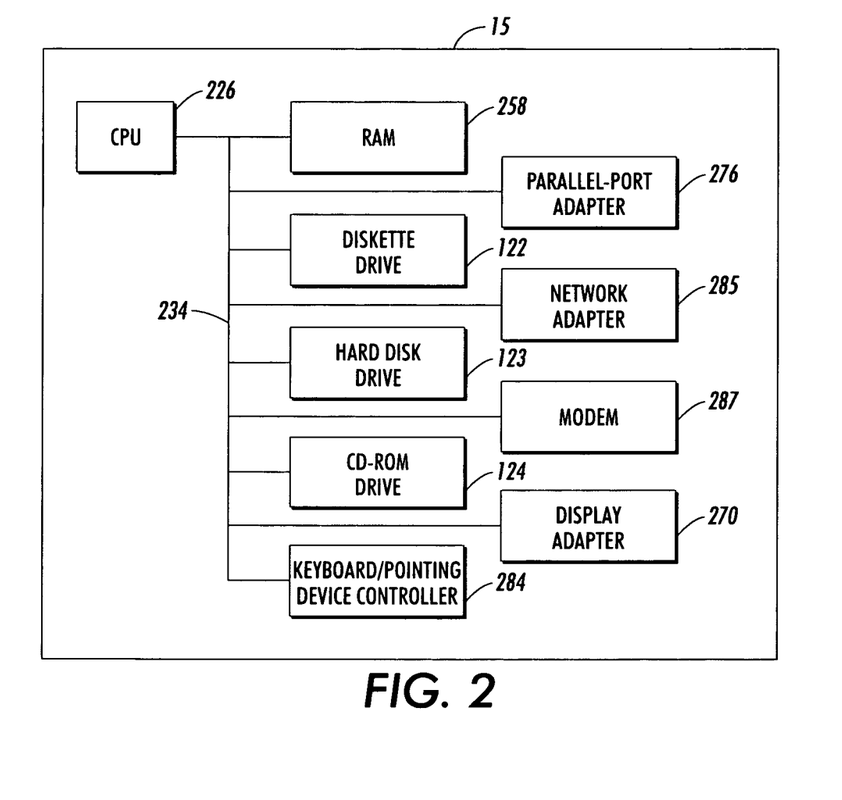
FIG. 2 illustrates a block diagram of the principal components of the data-processing apparatus and processing unit depicted in FIG. 1 in accordance with a preferred embodiment.

Referring to FIG. 2, there is depicted a block diagram of the principal components of data-processing apparatus 8 and in particular the processing unit 15. In general, a CPU (Central Processing Unit) 226 is connected via a system bus 234 to RAM (Random Access Memory) 258, diskette drive 122, hard-disk drive 123, CD-ROM drive 124, keyboard/pointing-device controller 284, parallel-port adapter 276, network adapter 285, display adapter 270, and modem 287. Although the various components of FIG. 2 are drawn as single entities, each may consist of a plurality of entities and may exist at multiple levels.

Processing unit 15 includes the CPU 226, which executes instructions. CPU 226 includes the portion of data-processing apparatus 8 that controls the operation of the entire data-processing 8, including executing the arithmetical and logical functions contained in a particular computer program. Although not depicted in FIG. 2, CPU 226 typically includes a control unit that organizes data and program storage in a computer memory and transfers the data and other information between the various parts of the computer system. CPU 226 generally includes an arithmetic unit that executes the arithmetical and logical operations, such as addition, comparison, and multiplication. CPU 226 accesses data and instructions from and stores data to volatile RAM 258.

CPU 226 can be implemented, for example, as any one of a number of processor chips, or any other type of processor, which are available from a variety of vendors. Although data-processing system 8 is shown to contain only a single CPU and a single system bus, the present invention applies equally to computer systems that have multiple CPUs and to computer systems that have multiple buses that each performs different functions in different ways.

RAM 258 comprises a number of individual, volatile-memory modules that store segments of operating system and application software while power is supplied to data-processing apparatus 8. The software segments can be partitioned into one or more virtual-memory pages that each contains a uniform number of virtual-memory addresses. When the execution of software requires more pages of virtual memory than can be stored within RAM 258, pages that are not currently needed are swapped with the required pages, which are stored within non-volatile storage devices 122 or 123. RAM 258 is a type of memory designed such that the location of data stored in it is independent of the content. Also, any location in RAM 258 can be accessed directly without needing to start from the beginning.

Hard-disk drive 123 and diskette drive 122 are electromechanical devices that read from and write to disks. The main components of a disk drive are a spindle on which the disk is mounted, a drive motor that spins the disk when the drive is in operation, one or more read/write heads that perform the actual reading and writing, a second motor that positions the read/write heads over the disk, and controller circuitry that synchronizes read/write activities and transfers information to and from data-processing apparatus 8.

Keyboard/pointing-device controller 284 interfaces processing unit 15 with keyboard 17 and graphical-pointing device 18. In an alternative embodiment, keyboard 17 and graphical-pointing device 18 may possess separate controllers. Display adapter 270 can translate graphics data from CPU 226 into video signals utilized to drive the display device 20.

Finally, processing unit 15 can include a network adapter 285, a modem 287, and a parallel-port adapter 276, which facilitate communication between data-processing system 8 and peripheral devices or other computer systems, such as, for example, the rendering device 9. Parallel-port adapter 276 can transmit printer-control signals to rendering device 9 through a parallel port. Network adapter 285 can connect data-processing apparatus 8 to an un-illustrated local area network (LAN). A LAN provides a user of data-processing system 5 with a means of electronically communicating information, including software, with a remote computer or a network logical-storage device. In addition, a LAN supports distributed processing, which enables data-processing apparatus 8 to share a task with other computer systems linked to the LAN, which can also be implemented in the context of a wireless local area network (WLAN).

Modem 287 supports communication between data-processing system 8 and/or system 5 over a standard telephone line. Furthermore, through modem 287, data-processing apparatus 8 can access other sources such as a server, an electronic bulletin board, and the Internet or the well-known World Wide Web.

The configuration depicted in FIG. 1 is but one possible implementation of the components depicted in FIG. 2. Portable computers, laptop computers, and network computers or Internet appliances are other possible configurations. The hardware depicted in FIGS. 1-2 may vary for specific applications. For example, other peripheral devices such as optical-disk media, audio adapters, or chip-programming devices, such as PAL or EPROM programming devices well-known in the art of computer hardware, may be utilized in addition to or in place of the hardware already depicted.

As will be described in detail below, aspects of the preferred embodiment pertain to specific method steps implementable on computer systems. In an alternative embodiment, the invention may be implemented as a computer program-product for use with a computer system, which can be implemented as devices such as networked computer workstations, computer desktop and peripheral devices, servers and the like. The programs defining the functions of the preferred embodiment can be delivered to a computer via a variety of signal-bearing media, which include, but are not limited to, (a) information permanently stored on non-writable storage media (e.g., read-only memory devices within a computer such as CD-ROM disks readable by CD-ROM drive 124); (b) alterable information stored on writable storage media (e.g., floppy disks within diskette drive 122 or hard-disk drive 123); or (c) information conveyed to a computer by a communications media, such as through a computer or telephone network, including wireless communications. Such signal-bearing media can carry computer-readable instructions that direct the functions of one or more embodiments and/or represent alternative embodiments.

Note that in order to appreciate the context in which the embodiments can be implemented, it is helpful to review a highlight-color ink naming technique. In some highlight-color printers, for example, highlight color toners include standard Red, Blue and Green. There are also a number of other special colors such as Ruby, Royal and Brown. It is a straightforward process for specifying a particular tint and shade of color in a highlight-color rendering device, such as a highlight-color LCDS printer. For example, to color a filled box, users simply identify how much black toner to mix in via a command that they embed in a document in the imaging data stream directed to a highlight color printer. For example, a highlight color such as 'R 30K10' can indicate to print a patch of color that is 30% Red toner and 10% black (K) ["K" is used for "black to avoid mixing up Blue ("B") and Black ("K")].

Whatever percentage is left over by default is the amount of white paper that shows through. Assume, for example, that 60% of the color is white, meaning that it is a light color. A color such as 'B100' (100% Blue toner) has no black mixed in and no white paper showing through. One can also utilize "H" to mean "generic Highlight toner" as in 'H50K10' (50% Highlight toner mixed with 10% black). When a document is ready to print, the specific Highlight toner to be utilized can be identified by naming a "Palette"—again via a command embedded in a document. In such a generic system, a full ink name can be composed of two parts: the "Palette" (like 'RED'), and the HK values (e.g., 'H50K10'). The "RED" palette informs the rendering device or printer to interpret the "H" as RED.

Later, if the toner physically loaded on the printer is changed to Green and the document is expected to be printed in shades and tints of Green, the Palette specification in the document can be changed to GREEN and all the colors such as 'H50K10' will print in the same tints and shades of green instead of red.

In a full-color LCDS configuration, for example, a number of legacy highlight color palettes (e.g., highlight toners) can be pre-defined, with more added to fill out the rainbow. The supplied LCDS pre-defined highlight color Palettes can be, for example, RED, BROWN, ORANGE, YELLOW, LIME, GREEN, TEAL, CYAN, BLUE, ROYAL, VIOLET, PURPLE, MAGENTA, RUBY and CARDINAL. For legacy highlight-color jobs, such pre-defined palettes can ensure that legacy jobs will print similarly on a full-color printer. In addition, for legacy Highlight-Color Forms or jobs that used "HK" color definitions, it is relatively easy to simply change the PALETTE to be any of the above pre-defined highlight color Palettes. New full-color Palettes can be defined, however, at will. If the supplied predefined Palettes are insufficient, any Named Color in the DOCUSP Color Manager (a color management tool) can be used as a "Palette".

Figure 3:
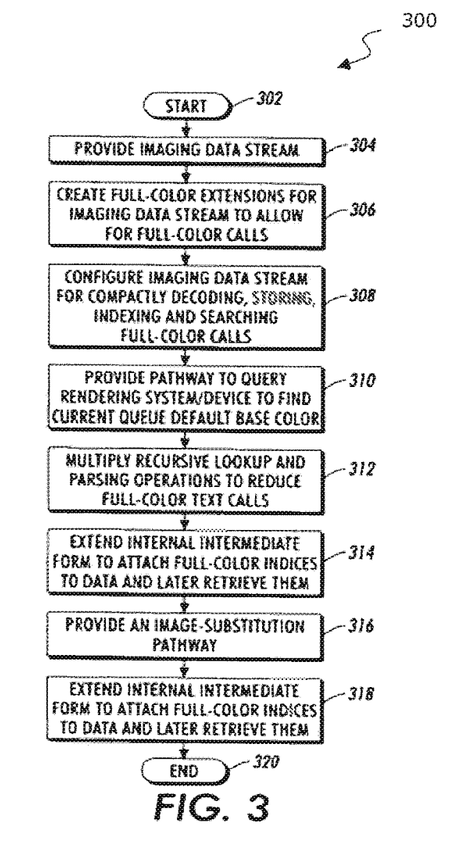
FIG. 3 illustrates a high-level flow chart of operations illustrating logical operational steps of a method, which may be implemented in accordance with a preferred embodiment.

FIG. 3 illustrates a high-level flow chart of operations illustrating logical operational steps of a method 300, which may be implemented in accordance with a preferred embodiment. The method 300 depicted in FIG. 3 generally extends existing highlight color imaging data stream decomposition to render a full-color imaging data stream. For example, in the context of an imaging data stream such as an existing highlight color LCDS data stream, method 300 can extend existing highlight color LCDS decomposition in order to render full-color LCDS. Method 300 can be implemented, for example, utilizing one or more DOCUSP full-color printers.

It can be appreciated, of course, that the use of LCDS and/or a DOCUSP full-color printer is presented for general illustrative purposes only and is not intended to limit the scope of the present invention.

As indicated at block 302, the process begins. Thereafter, as indicated at block 304, an imaging data stream (e.g., Highlight Color LCDS) can be provided. Next, as depicted at block 306, an operation can be processed for creating full-color extensions to the existing imaging data stream (e.g., Highlight Color LCDS) syntax, which allows full-color calls in an extensible set of color spaces. Thereafter, as indicated at block 308, an operation is processed for compactly decoding, storing, indexing and searching full color calls (e.g., LCDS full color calls) within a particular imaging data stream job, which is fully editable and extensible to replace the large, static, non-dynamic ink catalogs used in current imaging data streams, such as Highlight Color LCDS.

Following processing of the operation depicted at block 308, an operation can be implemented, as indicated at block 310, to provide a pathway to query the rendering device (e.g., rendering device 9) and/or rendering system (e.g., rendering system 5) in order to identify the current queue's default base color, when needed. Next, as depicted at block 312, an operation is processed for implementing a multiply-recursive look-up and parse algorithm to reduce full-color text calls to recognized color spaces. Thereafter, as described at block 314, an operation is processed for extending internal imaging data stream intermediate forms (e.g., text line/display list) in order to attach full-color indices to data and later retrieve them.

Again, an example of such an imaging data stream is a Highlight Color LCDS data stream. Next, as indicated at block 316, an operation can be processed, which provides an image-substitution pathway to allow full-color images in the imaging data stream to be substituted for mono or highlight images. Finally, as depicted at block 318, an operation is processed for automatically passing each data or image generated by the imaging data stream to a rendering interface for full-color rendering and printing. That is, for each data object or image generated by the imaging data stream, associated full-color information is passed and retrieved at an appropriate time to an imaging or rendering interface (e.g., DOCUSP CII (C Imager Interface)) library for full-color rendering.

Figure 4:
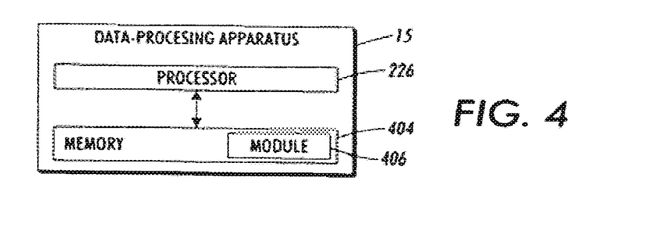
FIG. 4 illustrates a high-level block diagram of the data-processing apparatus in accordance with an alternative embodiment.

FIG. 4 illustrates a high-level block diagram of the data-processing apparatus 15 in accordance with an alternative embodiment. Note that the data-processing apparatus 15 can be associated and/or integrated with a rendering device such as rendering device 9 described earlier. Thus, in FIGS. 1-4, identical or similar parts or elements are generally indicated by identical reference numerals. Data-processing apparatus 15 (and hence rendering device 9) can be provided in the context of a software module 406 that is stored in a memory 404 and which can be retrieved and processed by a processor 226. Note that an example of memory 404 includes components such as, but not limited to the RAM 258 depicted in FIG. 2. Other examples of "memory" 404 include ROM (Read Only Memory), CD-ROM disks, flash memory, and so forth. In general, data-processing apparatus 15 can be composed of one or more processor readable storage devices (e.g., memory 404) having a processor readable code (e.g., software module 406) embodied on one or more of the processor readable storage devices, the processor readable code for programming one or more processors (e.g., CPU 226) to perform a particular activity.

Note that the embodiments disclosed herein can be implemented in the context of a host operating system and one or more module(s) such as module 406. Module 406 can thus be used to implement the operational steps of method 300 depicted in FIG. 3 herein. In the computer programming arts, a software module can be typically implemented as a collection of routines and/or data structures that perform particular tasks or implement a particular abstract data type. Software modules generally comprise instruction media storable within a memory location of a data-processing apparatus and are typically composed of two parts. First, a software module may list the constants, data types, variables, routines and the like that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules can be utilized separately or together to form a program product that can be implemented through signal-bearing media, including transmission media and recordable media.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method comprising:
providing a highlight Line Conditioned Data Stream, LCDS imaging data stream embodied as non-transitory instruction media residing in a computer; and
modifying said highlight Line Conditioned Data Stream, LCDS imaging data stream embodied as non-transitory instruction media residing in a computer to permit said highlight Line Conditioned Data Stream, LCDS imaging data stream to implement at least one full-color call for rendering full-color forms and full-color jobs via at least one rendering device within a rendering system.

2. The method of claim 1 further comprising:
creating and associating at least one full-color extension with a syntax of said highlight Line Conditioned Data Stream, LCDS imaging data stream embodied as non-transitory instruction media residing in a computer in order to implement said at least one full-color call in an extensible set of color spaces.

3. The method of claim 1 further comprising:
compactly decoding, storing indexing and searching said at least one full-color call a particular job of an LCDS imaging data stream; and
replacing an ink catalog in said highlight Line Conditioned Data Stream (LCDS imaging data stream) with said full-color call. embodied as non-transitory instruction media residing in a computer.

4. The method of claim 1 further comprising:
providing a pathway to query said rendering system to identify a current default base color of a rendering queue used in said rendering system, as required by said rendering system.

5. The method of claim 1 further comprising:
reducing at least one full-color text call associated with said highlight Line Conditioned Data Stream, LCDS imaging data stream embodied as non-transitory instruction media residing in a computer utilizing a multiply-recursive look-up and parse algorithm in order to recognize at least one color space of said highlight Line Conditioned Data Stream, LCDS imaging data stream.

6. The method of claim 1 further comprising:
modifying an intermediate form associated with said highlight color Line Conditioned Data Stream, LCDS imaging data stream embodied as non-transitory instruction media residing in a computer to attach at least one full-color index to data for a later retrieval of said at least one full-color index.

7. The method of claim 6 wherein said intermediate form comprises an internal Highlight LCDS intermediate form.

8. The method of claim 1 further comprising:
providing an image substitution pathway to permit at least one full-color image included in said highlight Line Conditioned Data Stream, LCDS imaging data stream embodied as non-transitory instruction media residing in a computer to be substituted for monochrome images or highlight color images.

9. The method of claim 1 further comprising:
automatically passing each data or image generated by said highlight Line Conditioned Data Stream, LCDS imaging data stream embodied as non-transitory instruction media residing in a computer to a rendering interface for full-color rendering.

10. The method of claim 1 further comprising:
creating and associating at least one full-color extension with a syntax of said highlight Line Conditioned Data Stream, LCDS imaging data stream embodied as non-transitory instruction media residing in a computer in order to implement said at least one full-color call in an extensible set of color spaces;
compactly decoding, storing, indexing, and searching said at least one full-color call within a particular job and replacing an ink catalog in said highlight Line Conditioned Data Stream (LCDS imaging data stream) with said full-color call;
providing a pathway to query said rendering system to identify a current default base color of a rendering queue used in said rendering system, as required by said rendering system;
reducing at least one full-color text call associated with said highlight Line Conditioned Data Stream, LCDS imaging data stream embodied as non-transitory instruction media residing in a computer utilizing a multiply-recursive look-up and parse algorithm in order to recognize at least one color space of said highlight Line Conditioned Data Stream, LCDS imaging data stream embodied as non-transitory instruction media residing in a computer;
modifying an intermediate form associated with said highlight Line Conditioned Data Stream, LCDS imaging data stream embodied as non-transitory instruction media residing in a computer to attach at least one full-color index to data and for a later retrieval of said at least one full-color index;
providing an image substitution pathway to permit at least one full-color image included in said highlight Line Conditioned Data Stream LCDS imaging data stream embodied as non-transitory instruction media residing in a computer to be substituted for monochrome images or highlight color images; and
automatically passing each data or image generated by said highlight Line Conditioned Data Stream, LCDS imaging data stream embodied as non-transitory instruction media residing in a computer to a rendering interface for full-color rendering.

11. A method comprising:
providing a highlight Line Conditioned Data Stream, LCDS imaging data stream; and
modifying said highlight Line Conditioned Data Stream, LCDS imaging data stream to permit said highlight Line Conditioned Data Stream, LCDS imaging data stream to implement at least one full-color call for rendering full-color forms and full-color jobs via at least one rendering device within a rendering system, wherein said modifying of said highlight Line Conditioned Data Stream, LCDS imaging data stream further comprises:
creating and associating at least one full-color extension with a syntax of said highlight Line Conditioned Data Stream, LCDS imaging data stream in order to implement said at least one full-color call in an extensible set of color spaces;
compactly decoding, storing indexing and searching said at least one full-color call within a particular job and replacing an ink catalog in said highlight Line Conditioned Data Stream (LCDS imaging data stream) with said full-color call;
providing a pathway to query said rendering system to identify a current default base color of a rendering queue used in said rendering system, as required by said rendering system;
reducing at least one full-color text call associated with said highlight Line Conditioned Data Stream, LCDS imaging data stream utilizing a multiply-recursive look-up and parse algorithm in order to recognize at least one color space of said highlight Line Conditioned Data Stream, LCDS imaging data stream;
modifying an intermediate form associated with said highlight Line Conditioned Data Stream, LCDS imaging data stream to attach at least one full-color index to data and for a later retrieval of said at least one full-color index;
providing an image substitution pathway to permit at least one full-color image included in said highlight Line Conditioned Data Stream, LCDS imaging data stream to be substituted for monochrome images or highlight color images; and
automatically passing each data or image generated by said highlight Line Conditioned Data Stream, LCDS imaging data stream to a rendering interface for full-color rendering.

12. An apparatus comprising one or more processor-readable storage devices having a processor-readable code embodied on said processor-readable storage devices, said processor-readable code programs one or more processors to perform a method, the method comprising:
providing a highlight Line Conditioned Data Stream, LCDS imaging data stream; and
modifying said highlight Line Conditioned Data Stream, LCDS imaging data stream to permit said highlight Line Conditioned Data Stream, LCDS imaging data stream to implement at least one full-color call for rendering full-color forms and full-color jobs via at least one rendering device within a rendering system.

13. The apparatus of claim 12 wherein said method further comprises:
creating and associating at least one full-color extension with a syntax of said highlight Line Conditioned Data Stream, LCDS imaging data stream in order to implement said at least one full-color call in an extensible set of color spaces.

14. The apparatus of claim 12 wherein said method further comprises:
compactly decoding, storing, indexing, and searching said at least one full-color call within a particular job of an LCDS imaging data stream; and replacing an ink catalog in said highlight line Conditioned Data Stream (LCDS imaging data stream) with said full-color call.

15. The apparatus of claim 12 wherein said method further comprises:
providing a pathway to query said rendering system to identify a current default base color of a rendering queue used in said rendering system, as required by said rendering system.

16. The apparatus of claim 12 wherein said method further comprises:
reducing at least one full -color text call associated with said highlight Line Conditioned Data Stream, LCDS imaging data stream, utilizing a multiply-recursive look-up and parse algorithm in order to recognize at least one color space of said highlight Line Conditioned Data Stream, LCDS imaging data stream.

17. The apparatus of claim 12 wherein said method further comprises:
modifying an intermediate form associated with said highlight Line Conditioned Data Stream, LCDS imaging data stream to attach at least one full-color index to data for a later retrieval of said at least one full-color index.

18. The apparatus of claim 12 wherein said method further comprises:
providing an image substitution pathway to permit at least one full-color image included in said highlight Line Conditioned Data Stream, LCDS imaging data stream to be substituted for monochrome images or highlight color images.

19. The apparatus of claim 12 wherein said method further comprises:
automatically passing each data or image generated by said highlight Line Conditioned Data Stream, LCDS imaging data stream to a rendering interface for full-color rendering.

20. The apparatus of claim 12 wherein said method further comprises:
creating and associating at least one full-color extension with a syntax of said highlight Line Conditioned Data Stream, LCDS imaging data stream in order to implement said at least one full-color call in an extensible set of color spaces;

compactly decoding, storing, indexing, and searching said at least one full-color call within a particular job of an LCDS imaging data stream; and replacing an ink catalog in said highlight Line Conditioned Data Stream (LCDS imaging data stream) with said full-color call;

providing a pathway to query said rendering system to identify a current default base color of a rendering queue used in said rendering system, as required by said rendering system;

reducing at least one full-color text call associated with said highlight Line Conditioned Data Stream, LCDS imaging data stream utilizing a multiply-recursive look-up and parse algorithm in order to recognize at least one color space of said highlight Line Conditioned Data Stream, LCDS imaging data stream;

modifying an intermediate form associated with said highlight Line Conditioned Data Stream, LCDS imaging data stream to attach at least one full-color index to data and for a later retrieval of said at least one full-color index;

providing an image substitution pathway to permit at least one full-color image included in said highlight Line Conditioned Data Stream, LCDS imaging data stream to be substituted for monochrome images or highlight color images; and automatically passing each data or image generated by said highlight Line Conditioned Data Stream, LCDS imaging data stream to a rendering interface for full-color rendering.

\* \* \* \* \*